(12) United States Patent
Wuest et al.

(10) Patent No.: US 11,134,085 B2
(45) Date of Patent: Sep. 28, 2021

(54) CLOUD LEAST IDENTITY PRIVILEGE AND DATA ACCESS FRAMEWORK

(71) Applicant: Sonrai Security Inc., New York, NY (US)

(72) Inventors: Ben A. Wuest, Fredericton (CA); William A. Bird, Fredericton (CA); Brad J. Peters, Fredericton (CA); Dasharath P. Chavda, Fredericton (CA); Gregory A. Davis, Fredericton (CA)

(73) Assignee: Sonrai Security Inc., New York, NY (US)

( * ) Notice: Subject to any disclaimer, the term of this patent is extended or adjusted under 35 U.S.C. 154(b) by 0 days.

(21) Appl. No.: 16/919,800

(22) Filed: Jul. 2, 2020

(65) Prior Publication Data

US 2020/0336489 A1 Oct. 22, 2020

Related U.S. Application Data

(63) Continuation-in-part of application No. 16/505,038, filed on Jul. 8, 2019, now Pat. No. 10,728,307.

(60) Provisional application No. 62/742,747, filed on Oct. 8, 2018.

(51) Int. Cl.
*H04L 29/06* (2006.01)
*G06F 21/45* (2013.01)
*G06F 21/62* (2013.01)

(52) U.S. Cl.
CPC .......... *H04L 63/102* (2013.01); *G06F 21/45* (2013.01); *G06F 21/62* (2013.01); *H04L 63/0823* (2013.01); *H04L 63/0876* (2013.01); *H04L 63/101* (2013.01); *H04L 63/108* (2013.01)

(58) Field of Classification Search
CPC .............. H04L 63/102; H04L 63/0876; H04L 63/0823; H04L 63/101; H04L 63/108; G06F 21/62; G06F 21/45
See application file for complete search history.

(56) References Cited

U.S. PATENT DOCUMENTS

| | | | |
|---|---|---|---|
| 9,466,051 B1 * | 10/2016 | Roth | G06F 21/31 |
| 9,571,479 B1 * | 2/2017 | Sundaram | H04L 63/105 |
| 9,774,586 B1 * | 9/2017 | Roche | G06F 21/6218 |
| 10,122,757 B1 * | 11/2018 | Kruse | H04L 63/10 |

(Continued)

*Primary Examiner* — Shirley X Zhang
(74) *Attorney, Agent, or Firm* — David H. Judson

(57) ABSTRACT

A network-accessible service provides an enterprise with a view of identity and data activity in the enterprise's cloud accounts. The service enables distinct cloud provider management models to be normalized with centralized analytics and views across large numbers of cloud accounts. Using a domain-specific query language, the system enables rapid interrogation of a complete and centralized data model of all data and identity relationships. The data model also supports a cloud "least privilege and access" framework. Least privilege is a set of minimum permissions that are associated to a given identity; least access is a minimal set of persons that need to have access to given piece data. The framework maps an identity to one or more actions collected in cloud audit logs, and dynamically-build a compete view of an identity's effective permissions. The resulting least privilege and access policies are then applied natively to a given cloud environment to manage access.

19 Claims, 16 Drawing Sheets

(56) References Cited

U.S. PATENT DOCUMENTS

| | | | | |
|---|---|---|---|---|
| 10,148,701 | B1* | 12/2018 | Hecht | G06F 9/455 |
| 10,454,938 | B2* | 10/2019 | Anderson | H04L 63/08 |
| 10,516,669 | B2* | 12/2019 | Bourgeois | H04L 63/10 |
| 10,771,337 | B1* | 9/2020 | Das | G06F 9/45512 |
| 10,778,691 | B1* | 9/2020 | Kissell | H04L 63/104 |
| 2009/0150981 | A1* | 6/2009 | Amies | H04L 67/02 |
| | | | | 726/5 |
| 2011/0004923 | A1* | 1/2011 | Smith | G06F 21/6218 |
| | | | | 726/4 |
| 2011/0023107 | A1* | 1/2011 | Chen | H04L 63/0281 |
| | | | | 726/12 |
| 2012/0271854 | A1* | 10/2012 | Truong | G06F 21/6227 |
| | | | | 707/785 |
| 2015/0200943 | A1* | 7/2015 | Pitre | G06F 21/45 |
| | | | | 726/1 |
| 2016/0087960 | A1* | 3/2016 | Pleau | H04L 63/104 |
| | | | | 726/7 |
| 2016/0173475 | A1* | 6/2016 | Srinivasan | H04L 63/08 |
| | | | | 726/6 |
| 2016/0274553 | A1* | 9/2016 | Strohmenger | G05B 17/02 |
| 2017/0099299 | A1* | 4/2017 | Sutton | H04L 63/083 |
| 2017/0295186 | A1* | 10/2017 | Movsisyan | G06F 16/9027 |
| 2017/0331832 | A1* | 11/2017 | Lander | H04L 63/0807 |
| 2018/0103063 | A1* | 4/2018 | Thurgood | H04L 63/102 |
| 2019/0007415 | A1* | 1/2019 | Kliger | H04L 63/104 |
| 2019/0132320 | A1* | 5/2019 | Burckhardt | H04L 41/28 |

* cited by examiner

```
public class UserReporter extends IdentityReporter<UserReporter> implements IReporter
{
    public enum Type {
        User,
        Service} public UserReporter(String uniqueName, ServiceReporter ServiceReporter)
            throws InvalidBuildArgumentException {
        super(EntityType.User, uniqueName, ServiceReporter);
    } public UserReporter withPasswordLastUsed(java.lang.Long value) {
        this.setProperty(PropertyType.passwordLastUsed, value);
        return this;
    } public UserReporter withUserName(java.lang.String value) {
        this.setProperty(PropertyType.userName, value);
        return this;
    } public UserReporter withType(Type value) {
        this.setProperty(PropertyType.type, value);
        return this;
    }
}
```

DYNAMICALLY GENERATED RESTRICTION ON TYPE

DYNAMICALLY GENERATED FROM PROPERTIES READ FROM INTELLIGENCE MODEL

FIG. 4

| CREATE | DELETE | MESSAGE | RESUME |
| ACTIVITY | STOP | ARCHIVE | ANALYTIC |
| ACTION | AUDIT | RESTORE | LOGIN |
| READ | START | AUTHENTICATION | FAILURE |
| UPDATE | CONFIGURE | ACCEPT | LOGOUT |

FIG. 9

| SecurityService | SQL | STREAMING | MountedDisk |
| SERVICE | MIGRATION | TRANSFER | VirtualHost |
| DATA | AI | BusinessProcess | VPS |
| ObjectStore | EMAIL | OperatingSystem | MediaProcessing |
| ANALYTIC | INDEX | DIRECTORY | MESSAGING |
| GEOLOCATION | HDFS | TimeSeries | WAREHOUSE |
| CONFIGURATION | FileSystem | LOCATION | AppDevelopment |

FIG. 10

```
{
    "type": "Entity",
    "name": "john.doe",
    "author": "audit",
    "properties": {
        "name": "john.doe",
        "active": true,
        "type": "User"
    },
    "objectType": "User",
    "createdDate": 1532722273000,
    "cloud": "aws",
    "service": "service",
    "account": "456234566655"
}
```

FIG. 12

| | ATTRIBUTE | DESCRIPTION |
|---|---|---|
| ORIGINATING IDENTITY | CLOUD | CLOUD NAME |
| | ACCOUNT | CLOUD ACCOUNT OF THE ORIGINATING IDENTITY |
| | ID | THE IDENTITY IN QUESTION. (START OF IDENTITY CHAIN) |
| IDENTITY CHAIN | IDENTITY CHAIN | THE COMPLETE IDENTITY THAT CORRESPONDS TO THE PERMISSION. THIS WILL BE THE SAME AS THE ROOT IDENTITY IF THE PERMISSION IS DIRECTLY TIED TO THE IDENTITY |
| POLICY | ID | THE ACTUAL POLICY THAT ENABLES THIS PERMISSION |
| ACTIVITY COUNT | COUNT | THE NUMBER OF TIMES THIS PERMISSION WAS ACTUALLY USED |
| PERMISSION | ACCOUNT | THE ACCOUNT OF THE EFFECTIVE PERMISSION |
| | VALUE | THE ACTUAL PERMISSION |
| | ACTION TYPE | THE ACTION TYPE PROVIDED BY THE UNIFIED CLOUD MODEL |
| | SERVICE TYPE | THE SERVICE TYPE PROVIDED BY THE UNIFIED CLOUD MODEL |
| | ACTION CLASSIFICATION | THE ACTION CLASSIFICATION PROVIDED BY THE UNIFIED CLOUD MODEL |
| | SERVICE CLASSIFICATION | THE SERVICE CLASSIFICATION PROVIDED BY THE UNIFIED CLOUD |

FIG.18

CLOUD LEAST IDENTITY PRIVILEGE AND DATA ACCESS FRAMEWORK

BACKGROUND

Technical Field

This application relates generally to cloud compute infrastructures and, in particular, to techniques to model and manage data across multiple cloud deployments.

Brief Description of the Related Art

Cloud computing is an information technology delivery model by which shared resources, software and information are provided on-demand over a network (e.g., the publicly-routed Internet) to computers and other devices. This type of delivery model has significant advantages in that it reduces information technology costs and complexities, while at the same time improving workload optimization and service delivery. In a typical use case, an application is hosted from network-based resources and is accessible through a conventional browser or mobile application. Cloud compute resources typically are deployed and supported in data centers that run one or more network applications, typically using a virtualized architecture wherein applications run inside virtual servers, or virtual machines, which are mapped onto physical servers in the data center. The virtual machines typically run on top of a hypervisor, which allocates physical resources to the virtual machines.

Enterprises moving to cloud deployments typically use multiple cloud accounts across a number of providers (e.g., Amazon® Web Services, Microsoft® Azure and Google® Cloud Platform) in a number of ways. They migrate existing workloads to reduce costs, build new customer facing applications, and move employee backend processes to a continuous integrations/continuous delivery model. Large data science workloads also are transitioning to the cloud in all sizes of companies, and the processing of such workloads requires large clusters of compute and storage, sometimes for short time periods.

The rapid adoption of cloud technology has left Security, Compliance and Development Operations (DevOps) teams struggling to keep pace. Indeed, securing cloud data across a single cloud provider is hard enough, but securing data across a multi-cloud deployment is a significant challenge to even the most talented Security and DevOp teams. Making the problem even more of a challenge is that the agility of the cloud quickly leads to an explosion of cloud accounts, data stores, and data movement. Unfortunately, existing low-level tools lack a cohesive security model for identities and data movement, and none work across multiple cloud providers. Further, hackers have not overlooked the new attack vectors introduced by rapid cloud adoption. Every day, the media reports stories of significant cloud vulnerabilities and data breaches. Compounding this problem further, is that business often have to comply with not one, but potentially multiple government or industry regulations around data security. Moreover, rapid growth in the cloud has lead to mind-numbing complexities and inefficiencies for DevOps and Security teams alike.

Accordingly, there is a need to provide tools and methods that enable enterprises that use multi-cloud deployments to obtain a comprehensive view of all identity and data activity across the enterprise's cloud accounts.

BRIEF SUMMARY

This disclosure provides a cloud data control intelligence framework for modeling, reporting, storing and querying cloud resources and the connections among them. The framework preferably leverages a unified cloud intelligence data model. The framework is dynamic in that adjustments are made to the intelligence data model based on changes occurring in the underlying cloud resources. Further, key assets related to the reporting, storing and querying of resources dynamically update to reflect changes in the underlying intelligence model. In one embodiment, the framework provides a cloud risk control system that provides an enterprise the ability to continuously manage and interact with modern cloud environments, even as such environments themselves change and evolve.

According to a further aspect of this disclosure, the unified cloud intelligence data model supports a cloud "least privilege and access" framework. The notion of "least privilege" refers to the notion of determining a set of minimum permissions that are associated to a given identity; the notion of "least access" refers to determining a minimal set of persons that need to have access to given piece data. This framework is provided to map an identity to one or more actions collected in cloud audit logs, and to dynamically-build a compete view of an identity's effective permissions, thereby resolving what data the identity has access to in order to produce least privilege and least access policies. The least privilege and access policies are then applied natively to a given cloud environment to refine access as necessary.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 4 depicts a representative user entity reporter;

FIG. 9 lists examples of normalized action types;

FIG. 10 lists examples of normalized service types;

FIG. 12 depicts an example of a JSON code fragment generated by dynamic entity generation code in one embodiment;

FIG. 18 depicts a representative table describing an effective permissions entry for a given identity in a representative embodiment.

DETAILED DESCRIPTION

Figure 1:
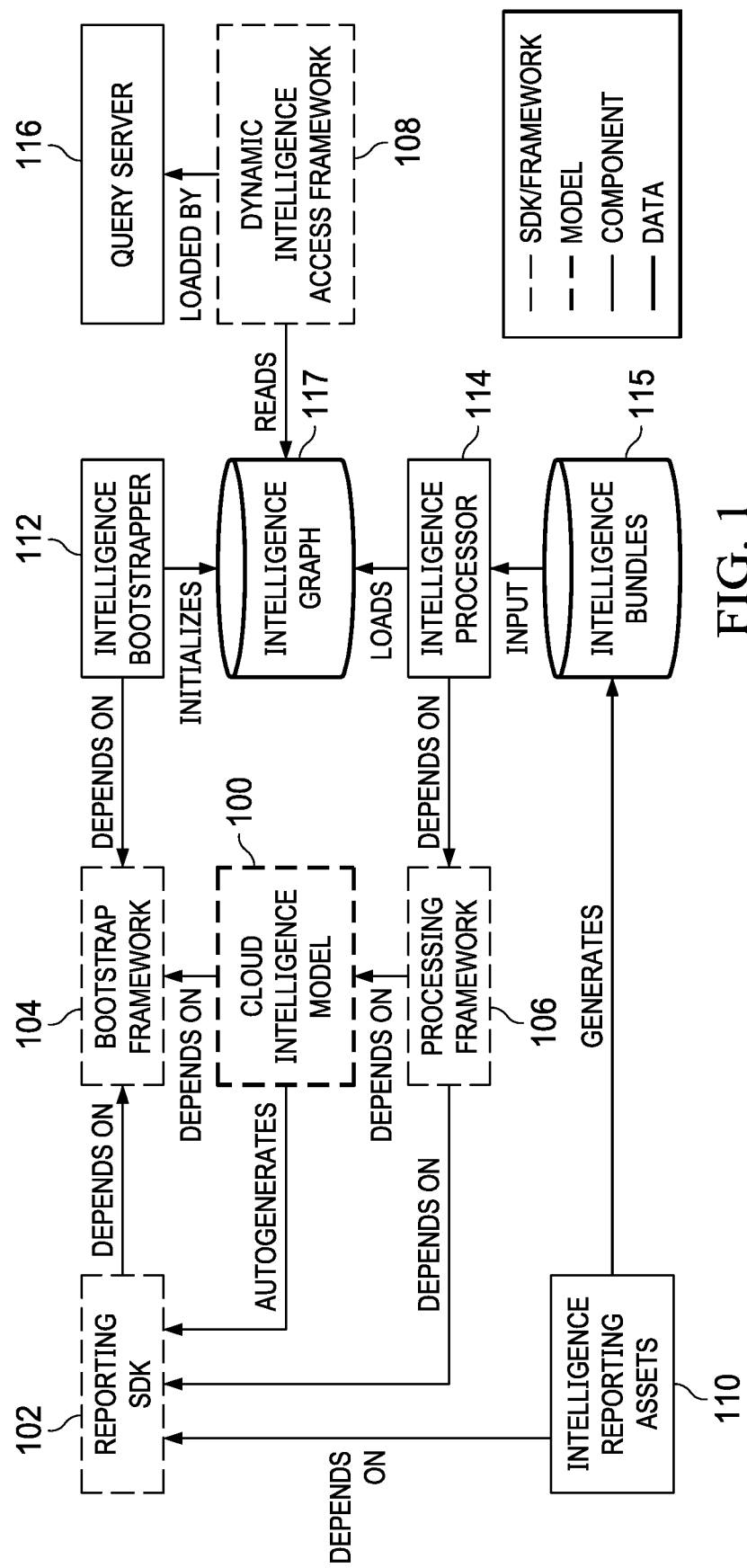
FIG. 1 depicts a framework architecture for a cloud risk intelligence platform according to this disclosure.

As described, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). Typically, a cloud computing infrastructure may comprise co-located hardware and software resources, or resources that are physically, logically, virtually and/or geographically distinct. Communication networks used to communicate to and from the platform services may be packet-based, non-packet based, and secure or non-secure, or some combination thereof. Typically, the cloud computing environment has a set of high level functional components that include a front end identity manager, a business support services (BSS) function component, an operational support services (OSS) function component, and the compute cloud components themselves.

According to this disclosure, the services platform described below may itself be part of the cloud compute infrastructure, or it may operate as a standalone service that executes in association with third party cloud compute services, such as Amazon® AWS, Microsoft® Azure, IBM® SoftLayer®, and others.

Each of the functions described herein may be implemented in a hardware processor, as a set of one or more computer program instructions that are executed by the processor(s) and operative to provide the described function.

The server-side processing is implemented in whole or in part by one or more web servers, application servers, database services, and associated databases, data structures, and the like.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, networking technologies, etc., that together provide the functionality of a given system or subsystem. As described, the functionality may be implemented in a standalone machine, or across a distributed set of machines.

A front-end of the below-described infrastructure (e.g., a customer console or portal) is also representative of a web site (e.g., a set of one or more pages formatted according to a markup language). Interaction with the portal may also take place in an automated manner, or programmatically, and the portal may interoperate with other identity management devices and systems.

As will be described below, and in a representative use case, an enterprise has relationships with multiple cloud providers, with each cloud provider typically implementing a network-accessible cloud computing infrastructure. This is sometimes referred to herein as a "multi-cloud" deployment. An enterprise multi-cloud deployment typically is one in which there are multiple cloud accounts, data stores, and data movement within and across the various cloud deployments provided by the multiple cloud providers. As will be described, and according to this disclosure, a Cloud Data Control (CDC) service provides an enterprise (typically, a service customer or "subscriber") the ability to generate and use a complete risk model of all identity and data relationships, including activity and movement across cloud accounts, cloud providers and third party data stores. Typically, the risk model is maintained by the CDC service provider and exposed to the enterprise customer via one or more display(s), typically web-accessible dashboards. Using the service, an enterprise subscriber obtains continuous visibility into a wide range of security concerns including multi-cloud security monitoring, data sovereignty, data exposure detection, audit tampering and identity governance. Data managed by the data model enables the service to provide the subscriber data risk dashboards that include, without limitation, (i) views by cloud accounts, geography, data and protection, user and identity, compliance, and public exposure; (ii) security alerts (e.g., over-privileged users with access to PII, failed privilege escalation attempts, audit functions disabled by user, unusual data movement, separation of duties violations, data movement to public network, shared credential violations, etc.), (iii) compliance dashboards indicating data sovereignty, data movement and identity relationships (e.g., GDPR, HIPAA, PCI dashboards, data sovereignty monitoring, data asset inventory, customized controls and compliance dashboards, monitoring PII data movement, etc.)

The CDC service typically is implemented by a service provider "as-a-service" on behalf of a participating enterprise customer. In a typical use case, the enterprise customer subscribes to the CDCaaS solution described herein. The enterprise includes its own on-premises infrastructure (networks, servers, endpoints, databases, etc.), internal IT teams (e.g., Security, Compliance, DevOps, etc.), as well as its relationships with one or more cloud providers that provide cloud-based infrastructure. Except to the extent the enterprise internal systems and the cloud provider infrastructure(s) interoperate with the CDC service (typically via data exchange), the subscriber and cloud provider infrastructures are external to the CDC service, which typically is operated and managed separately.

FIG. 1 depicts a preferred framework architecture for a cloud risk management platform that provides the CDC service according to an embodiment of this disclosure. The architecture comprises a number of software and data components or subsystems. The functional components need not be implemented as distinct elements, as various components may be combined with one another. Further, the components may execute independently of one another, and they may execute in different locations or using multiple computing entities. Typically, a computing entity that supports a component or data store is a computer or computing system that comprises one or more processors, storage and memory, network interfaces, etc. As depicted, typically the platform comprises cloud intelligence data model 100, a reporting Software Development Kit (SDK) 102, a set of one or more code frameworks, namely a graph bootstrap framework 104, an intelligence processing framework 106, and a dynamic intelligence framework 108, as well as various system components comprising intelligence reporting assets 110, an intelligence bootstrapper 112, an intelligence processor 114, and a query server 116. As noted, these components typically are implemented in software executing on hardware processing elements. One or more components may be combined with one another or execute as separate processes. The particular relationships and dependencies between and among the various components of the framework are depicted in FIG. 1 for explanatory purposes and are not intended to be limiting.

The cloud intelligence model 100 is central to the framework, as it enables the CDC service to provide a subscriber a view of all identity and data activity in the enterprise's cloud accounts. Preferably, there is a cloud intelligence model developed and maintained for each subscriber to the service. Typically, this model is decoupled from the actual technical implementation in the reporting SDK 102, the code frameworks, and the processing components, although each of which depend on this model closely. In a representative, but non-limiting embodiment, the model 100 is a cloud environment data model for a particular subscriber that is based on observed patterns across multiple cloud environments. As will be described, this solution provides a unified approach to modelling data, identity, infrastructure and protection. Preferably, the model 100 comprises an object model (e.g., all cloud entities and their corresponding properties, the allowed connections between and among cloud entities, and multi-level interfaces for the cloud entities), storage properties (e.g., index, types, etc.) for all or some of the above, and query properties of the object model.

Several of the components depicted in FIG. 1 typically are supported using computing systems and services technologies configured as follows. The cloud intelligence model 100 is pre-processed to generate the reporting SDK 102, which it then embedded into the code comprising the intelligence reporting assets subsystem 110; the intelligence reporting assets 110 (which include the embedded reporting SDK as auto-generated from the pre-processed cloud intelligence model) in turn reside within the cloud computing resources (systems, sub-systems, etc.) that are to be monitored by the cloud intelligence system of this disclosure. Thus, for example, the intelligence reporting assets 110 are configured to execute within or in association with a particular cloud computing system or resource (e.g., an Amazon® container running DynamoDB, etc.) and, as a result of that monitoring the intelligence reporting assets 110 generate the intelligence bundles 115. An intelligence bundle 115 thus is generated for each particular cloud compute deployment that is being monitored. The intelligence bundle 115 includes the information about the cloud accounts, resources, etc. that the subscriber has provisioned in or is other using in each such cloud compute deployment. In a representative implementation, the service provider deploys a Docker container or the like (that maintains the intelligence reporting assets 110 and the embedded reporting SDK 102) in the third party cloud computing deployment for support of the data collection. Typically, data collection with respect to a particular cloud deployment (and for a particular customer) occurs during an initial discovery phase, and then runs continuously thereafter (e.g., nightly). As noted, the intelligence reporting assets subsystem 110 collects that data from the external cloud deployment(s) and generates the one or more intelligence bundles 115. As noted, a bundle is associated with an enterprise subscriber and encapsulates the subscriber's data (e.g., identity and data activity, etc.) retrieved from each cloud deployment being used by the subscriber. The intelligence processor 114 receives an intelligence bundle and processes it under the control of the processing framework 106, thereby generating an intelligence graph 117 (subscriber-specific). Because the processing framework depends on the cloud intelligence model 100, and because the intelligence processor 114 depends on the processing framework 106, the model 100 is embedded/instantiated in the intelligence graph 117. An initial version of the intelligence graph is initialized by the intelligence bootstrapper 112, and the intelligence graph is updated (by the intelligence processor 114) as the intelligence bundle 115 is updated (by changes in the local cloud compute deployment, as reported by the intelligence reporting asserts 110). The intelligence graph 117 is configured to be queried by a query server 116, which executes on an application server subsystem and, together with a web server, preferably exposes a query-able display interface (e.g., as a set of web pages) to authenticated and authorized enterprise users. Typically, an enterprise user interacts with the query server sub-system using a client browser or mobile app.

FIG. 1 depicts the various dependencies and interactions among the components and data elements that are described above. As shown, the bootstrap framework 104, the processing framework 106 and the intelligence processor 114 depend on the cloud intelligence data model 100. As described, the intelligence processor 114 also receives as input the intelligence bundle(s) 115 that are generated by the cloud-deployed intelligence reporting assets subsystem 110 (which as noted also includes the embedded reporting SDK itself generated from the model). The processing framework 106 processes the data model (in the manner described below in more detail) and provides results of such processing to the intelligence processor subsystem 114, which in turn generates the intelligence graph 117 that is exposed to a dynamic intelligence access framework 108 loaded by the query server 116 to thereby respond to data queries. As noted above, typically each cloud intelligence data model (one per subscriber) has an associated intelligence graph 117. The intelligence graph 117 is a knowledge-based structure of edges and nodes that is generated by an intelligence bootstrapper component 112, which in turn depends on a bootstrap framework 104 that receives the data model as input. Upon initialization, the data model (and associated data) is stored inside the intelligence graph.

Generalizing, these subsystems and data structures interact in the manner depicted in FIG. 1 to collect, organize, manage and display the data to the subscriber via the above-described query-able dashboards. Further details regarding these components are provided below.

As noted above, and to provide the CDC service to a participating subscriber, the system generates and manages a cloud intelligence data model for each subscriber. As noted above, the data model is stored inside the intelligence graph upon startup. A representative data model schema that supports this data model is now described.

Figure 2:
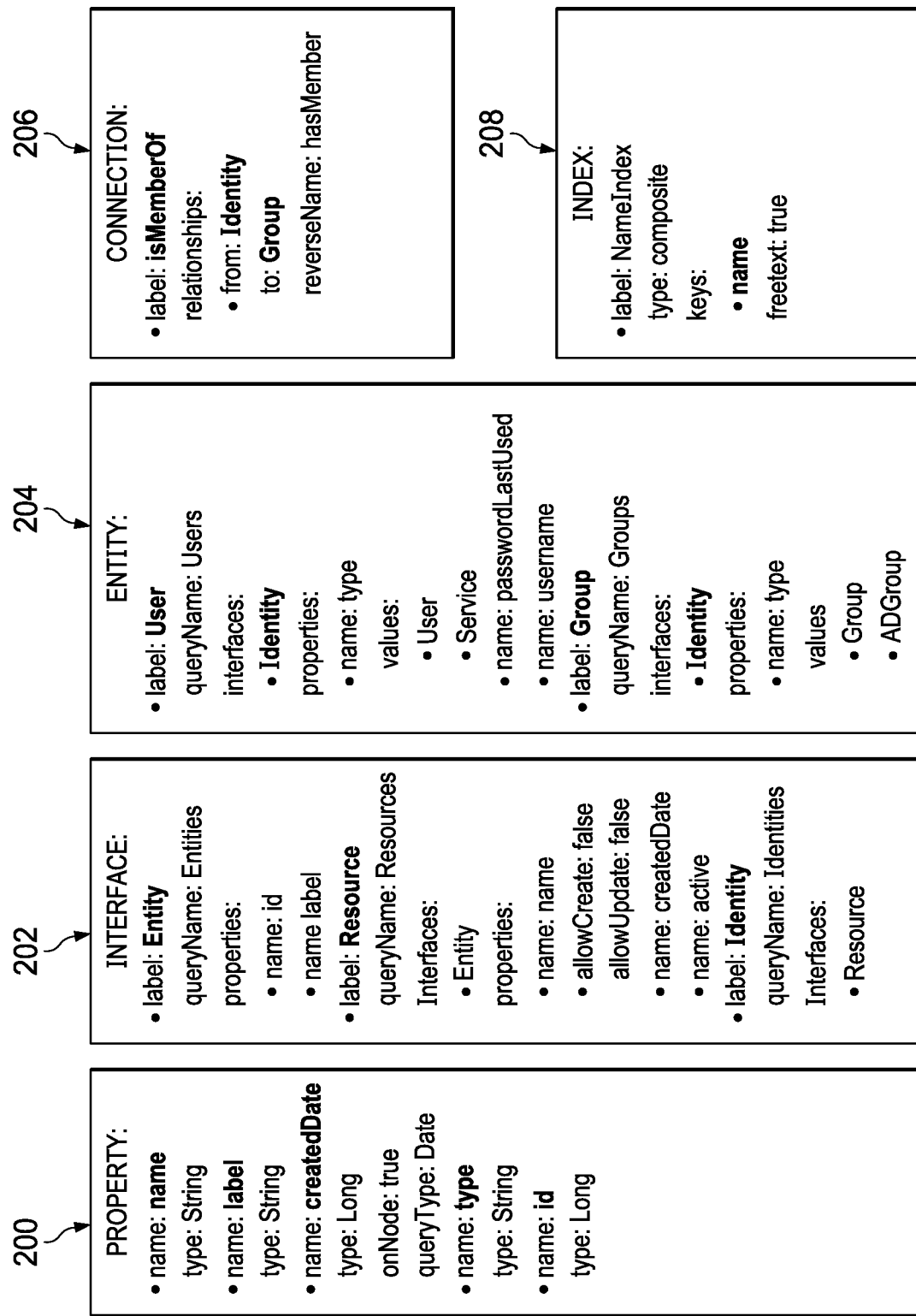
FIG. 2 is a representative data model implemented in one embodiment.

In particular, FIG. 2 depicts a sample from the model 100 with respect to objects referred to herein as Users and Groups. As depicted, the model preferably defines properties 200, interfaces 202, entities 204, connections 206 and indexes 208. Within each of these definitions are pieces of information that are collected, managed and leveraged by the various parts of the framework. The following provides additional examples of these representative portions of the data model.

Property Definition

The following is a representative scheme for the property definition (Attribute|Description): name|Name of the property; type|the storage type for the property; onNode|directs storage to either put the property on the entity or not; queryType|the type to use in the query interface (e.g., in FIG. 2, the createdDate is stored as Long but queried as Date).

Interface Definition

Interface definitions are primarily used for reporting and querying data. They need not be stored in the data store. The concept of interfaces allows the hierarchy of a query to change the entities that are stored in the actual data store. Preferably, there are layers of inheritance that allow the framework to look for all entities that conform to a particular interface. For example, the sample in FIG. 2 directs the query server to return both User and Groups when the query asks for all contained Identities.

Preferably, Interfaces can also extend Interfaces. This is shown in FIG. 2, where the chain of User-Identity-Resource-Entity is represented from an inheritance point of view. The following is a representative scheme for the Interface definition (Attribute|Description): label|the name/label of the interface; queryName|the name used by the query/access framework; interfaces|any interfaces that the given interface extends; and properties|any properties that exist on the given interfaces, and any interface or entity that extends this interface will inherit these properties.

Entity Definition

Entity definitions define entities that are used in reporting, querying and storage. They extend Interfaces but preferably do not extend each other. The following is a representative scheme for the Entity definition (Attribute|Description): label|the name/label of the interface; queryName|the name used by the query/access framework; interfaces|any interfaces that the given interface extends; and properties|any properties that exist on the given interfaces, and any interface or entity that extends this interface will inherit these properties.

In addendum to the properties defined above, properties preferably enforce types on the reporting and query layers. For instance, in the User entity defined in FIG. 2, the type is restricted to User or Service. This ensures integrity in the reporting and query sections of the framework.

Connection Definition

The connection definitions allow the query framework to expose queries to the user, and for the storage framework to appropriately store relationships in the data model. Each connection preferably has a label and can contain multiple relationships (meaning multiple entities can use the same connection identifier). In the above example, which is merely representative, a relationship between Identity and Group is established, thereby defining that anything that extends Identity can have a "isMemberOf" connection with Group Entity. The following is a representative scheme for the Connection definition (Attribute|Description): label|the name of the connection relationships All the relationships that use this connect. Each relationship entry contains a: fromNode, a toNode, and a reverseName.

Index Definition

Index definitions are primarily used by the bootstrap and storage layers. They define what properties need to be indexed and how to support the use cases placed on the intelligence framework. The following is a representative scheme for the Index definition (Attribute|Description): label|the name of the index; type|the index type; keys|properties included by the framework (must be referenced in the property definition); and freetext|a flag identifying if the index is free text or not.

As referenced above, the reporting SDK depicted in FIG. 1 provides a means for reporting data that can be consistently consumed by the framework. Preferably, the reporting SDK is dynamically-generated from the intelligence model such that, as updates are made to the model, new reporting assets are easily produced using a newly-generated SDK. As implemented, typically the reporting SDK is embedded within the intelligence reporting assets that are deployed in the cloud compute environment to be monitored.

Figure 3:
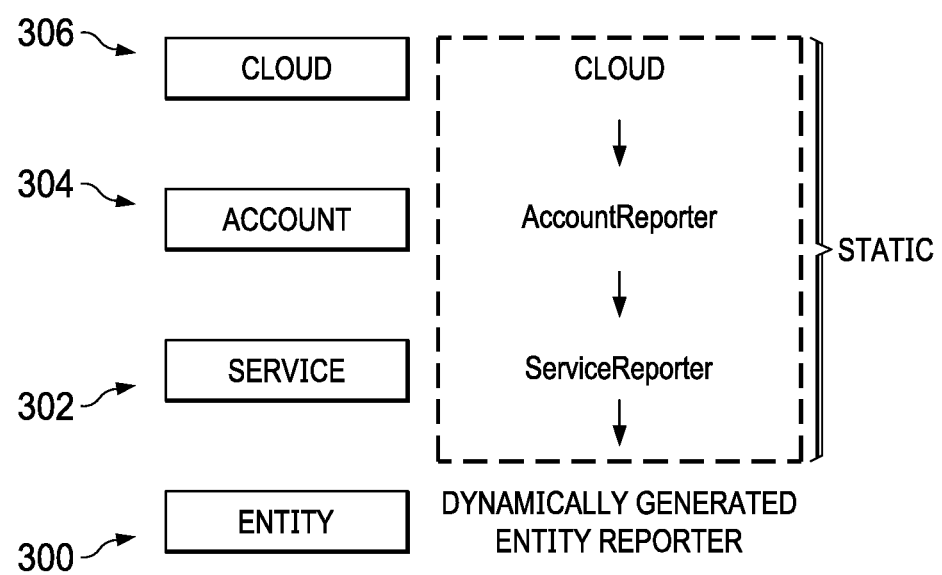
FIG. 3 depicts a representative base reporting framework.

Referring to FIG. 3, at the base of the SDK reporting framework is the notion that any entity 300 in the data model preferably also exists as part of a service 302, an account 304 and a cloud 306 in the framework. This means that an entity (see, FIG. 2, 204) typically is reported with respect to (in association with) a service, account and/or cloud. As depicted, a dynamically-generated entity reporter component exposes entity-specific information, whereas the respective service, account and cloud-specific is exposed by the respective ServiceReporter, AccountReporter and CloudReporter components, which components provide static information. Referring now to FIG. 4, a portion of the dynamically-generated entity reporter component is shown. This portion (which is part of the reporting SDK 102) is generated and embedded in the deployed intelligence reporting assets 110. This particular portion is the SDK code used to collect and report information regarding user identity. The code snippets that are dynamically-generated are shown. Thus, e.g., there are several code snippets ("PasswordLastUsed," "UserName," "Type") that (in this example) depend on the "properties" that are read from the cloud intelligence model. Taken together, FIGS. 3 and 4 depict how the intelligence model is used to enable dynamic generation of the reporting code for a particular cloud data source that is to be monitored.

In operation, preferably dynamic entity generation code reads all the Property, Interface, Entity and Connection definitions from the intelligence model to produce a set of reporters that produce intelligence, preferably in a JSON standard format such as depicted below in a representative snippet as depicted in FIG. 12.

By reading the model, a User Entity Reporter is produced through templates that are written in a given computer language. As previously described, FIG. 4 is an example reporter in the Java Programming Language.

Preferably, the dynamically-generated assets in the reporting SDK implement a reporter interface, which interprets the data produced by any reporter and produces a standard format. This allows a consistent way for the reporting SDK to report data.

Preferably, the code frameworks that are part of the framework provide capabilities built upon the Reporting SDK and Object Model to bootstrap an intelligence graph 117 (see FIG. 1) according to the specifications of the cloud intelligence model, process intelligence reported to store that data in the intelligence graph, and enable query on the data in the intelligence graph. As used herein, and generalizing, a code framework refers to software providing some basic functionality that is selectively changed by additional user-written code, thus providing application-specific software. A code framework of this type provides a mechanism to build and deploy applications. A code framework may include support programs, compilers, code libraries, tool sets, and application programming interfaces (APIs) that bring together all different components to enable development of a system.

The code frameworks, which preferably dynamically adjust according to the cloud intelligence model, provide a support mechanism underlying the other cloud risk control system processing components, as is now described Preferably, and as depicted in FIG. 1, these code frameworks comprise the data bootstrap framework 104, the data processing framework 106, and the dynamic data access framework 108, all of which are now further described.

Figure 5:
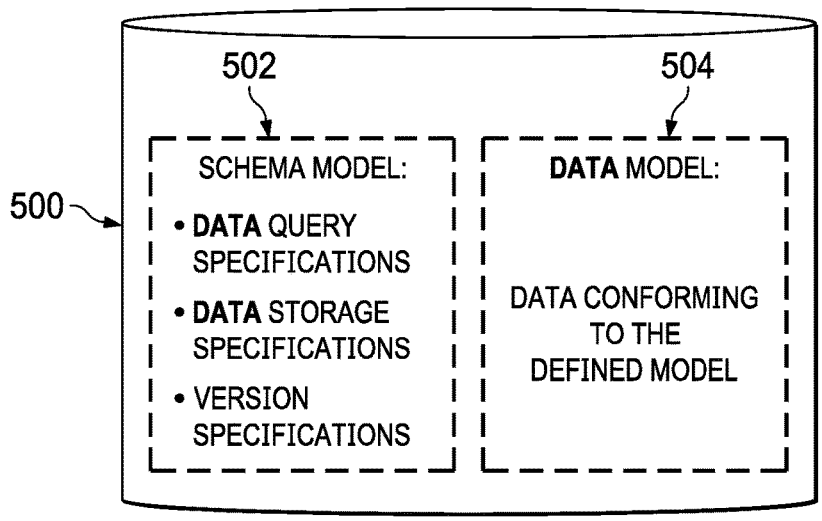
FIG. 5 depicts a representative data store.

The bootstrap framework 104 is responsible for building a data model from the model definition that contains sufficient information for the dynamic intelligence access framework 108 to build a schema for querying the contained data and a model to allow processing components to store the data. A data store 500 bootstrapped by the framework 104 preferably contains two sections (one for the model schema 502, and the other for the actual subscriber-specific data 504 comprising the data model), as depicted schematically in FIG. 5. The model schema 502 typically comprises data query specification, data storage specifications, version specifications, and so forth.

The bootstrap framework 104 preferably also provides several capabilities used by the intelligence bootstrapper component 112 to prepare a data store, namely: initialization of an empty data store with the model schema, translation of the intelligence model into the model schema, and initialization of the data schema based on the information in the model schema.

Figure 6:
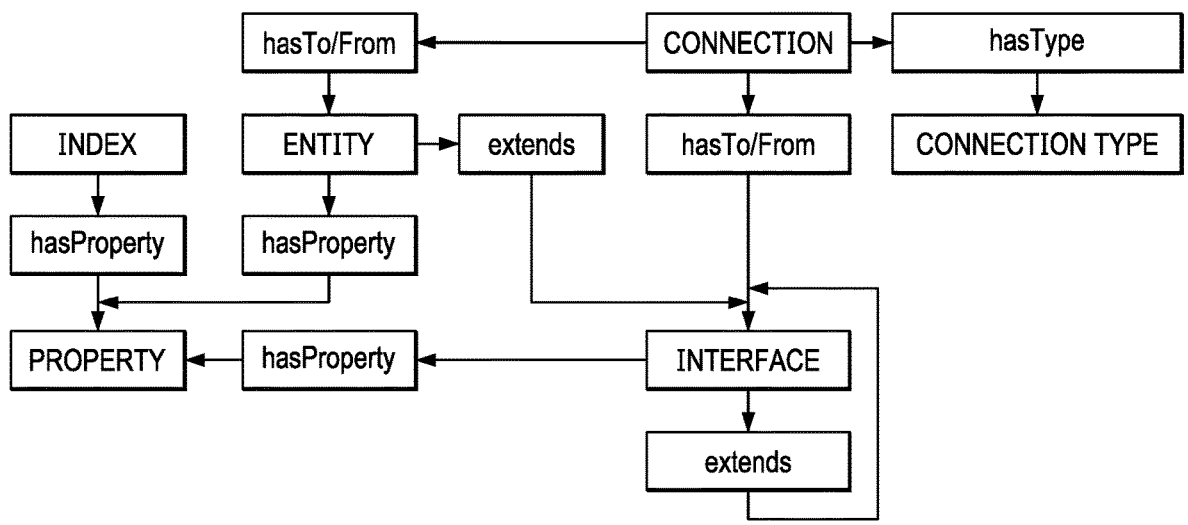
FIG. 6 depicts a representative data model schema.

The model schema generated (see, e.g., FIG. 6) preferably is a static model used by the framework. This is the preferred schema for which all the information provided by the intelligence model is entered, and the various elements (Property, Interface, Entity, Connection, Index) are as specified in FIG. 2. As further described, the query framework (namely, the query server and the dynamic intelligence access framework) reads this model schema to dynamically generate a query schema used to query the data contained in the data section of the model.

Preferably, the data processing framework 106 is built (depends) upon the reporting SDK, which is automatically generated from the cloud intelligence model 100. The processing framework 106 reads intelligence and stores it in the framework data store. The processing framework 106 validates incoming intelligence against the framework data store to which connects, e.g., by examining its contained schema model.

The dynamic intelligence access framework 108 ties these other frameworks together. Because the framework data store contains the schema model that tabulates all the information from the model (including entities, connections, interfaces and connections), the dynamic data access framework 108 builds up a domain-specific query language based on this information, and this functionality allows the system to reliably and efficiently query the system as the model and/or data changes. The dynamic data access framework also provides the generic capability to drive system APIs, User Interfaces and System components.

The system components (which preferably built upon the code frameworks) provide a cohesive cloud intelligence control framework that reports intelligence from one or more cloud environments, processes and store the intelligences, and enables querying and analysis of the data. Because of the dynamic nature of the entire framework, updated components dynamically adjust to changes from the cloud intelligence model.

The framework provides significant advantages. It provides a unified cloud intelligence model and query framework. A cloud risk control system that leverages the unified cloud model can assess resources across multiple clouds and accounts in a unified fashion. Asking questions like "show me over-permissioned users" are consistent regardless of where the intelligence comes from. The framework is dynamic and responds to model updates. The techniques herein provide for updating code (e.g., SDK reporter code paths) and internal data and processing components as the cloud landscape evolves. The framework allows a cloud risk control system to continually evolve as new capabilities are introduced by cloud providers, and as new workloads are introduced to cloud infrastructures.

Generalizing, the cloud intelligence model described above (sometimes also referred to as a Cloud Risk Control (CRC) data model) unifies the view of Identity, Data, Protection and Infrastructure across multiple clouds and accounts. There are two components to this model that provide context to Cloud Risk Control (CRC). They are a unified classification model of cloud actions and services, and normalized pathing analytics. Further details of these aspects are now described.

Figure 7:
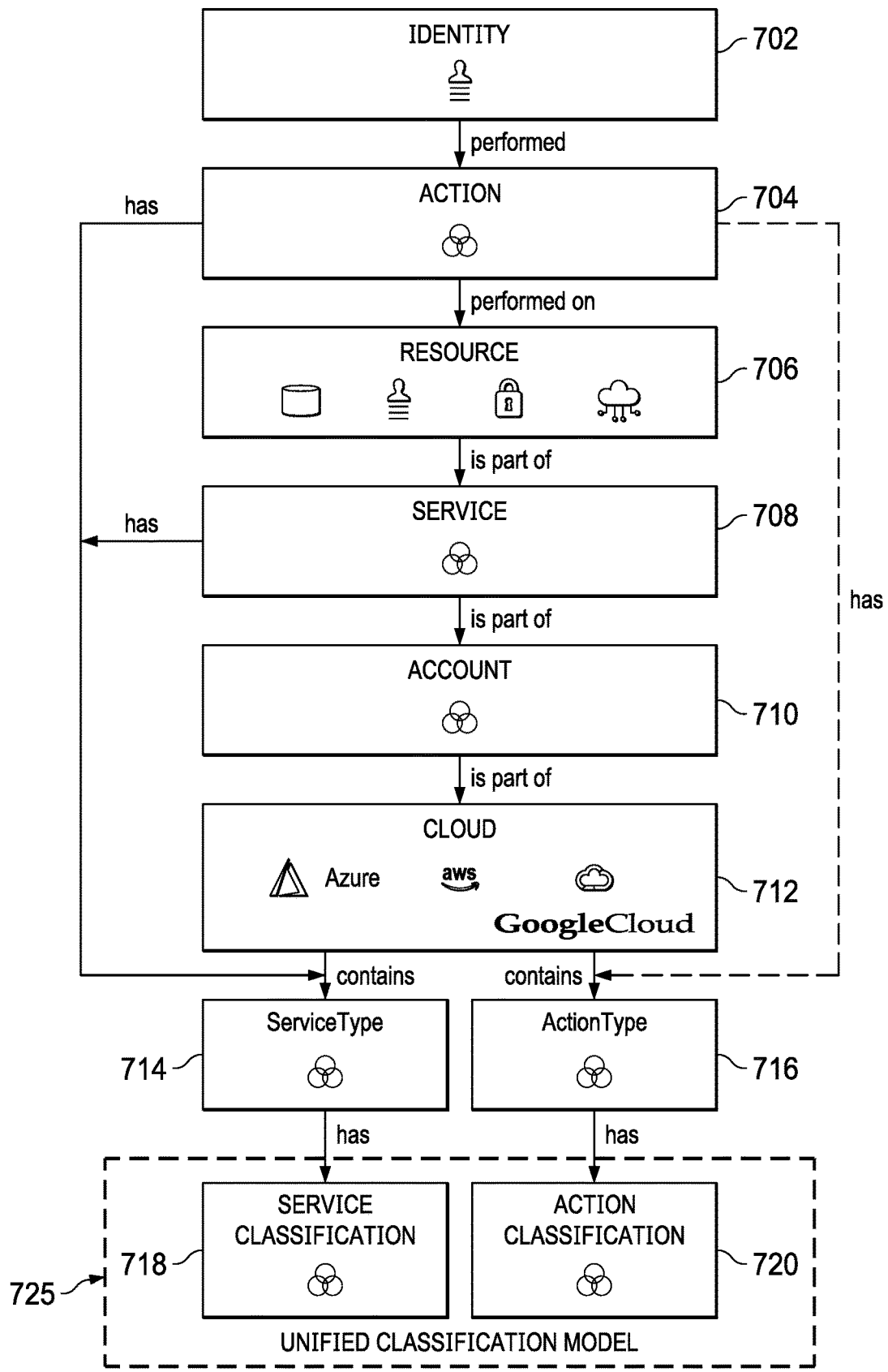
FIG. 7 depicts how a unified classification model ties to specific service and action types, and the corresponding actions from a given cloud provider.
Figure 8:
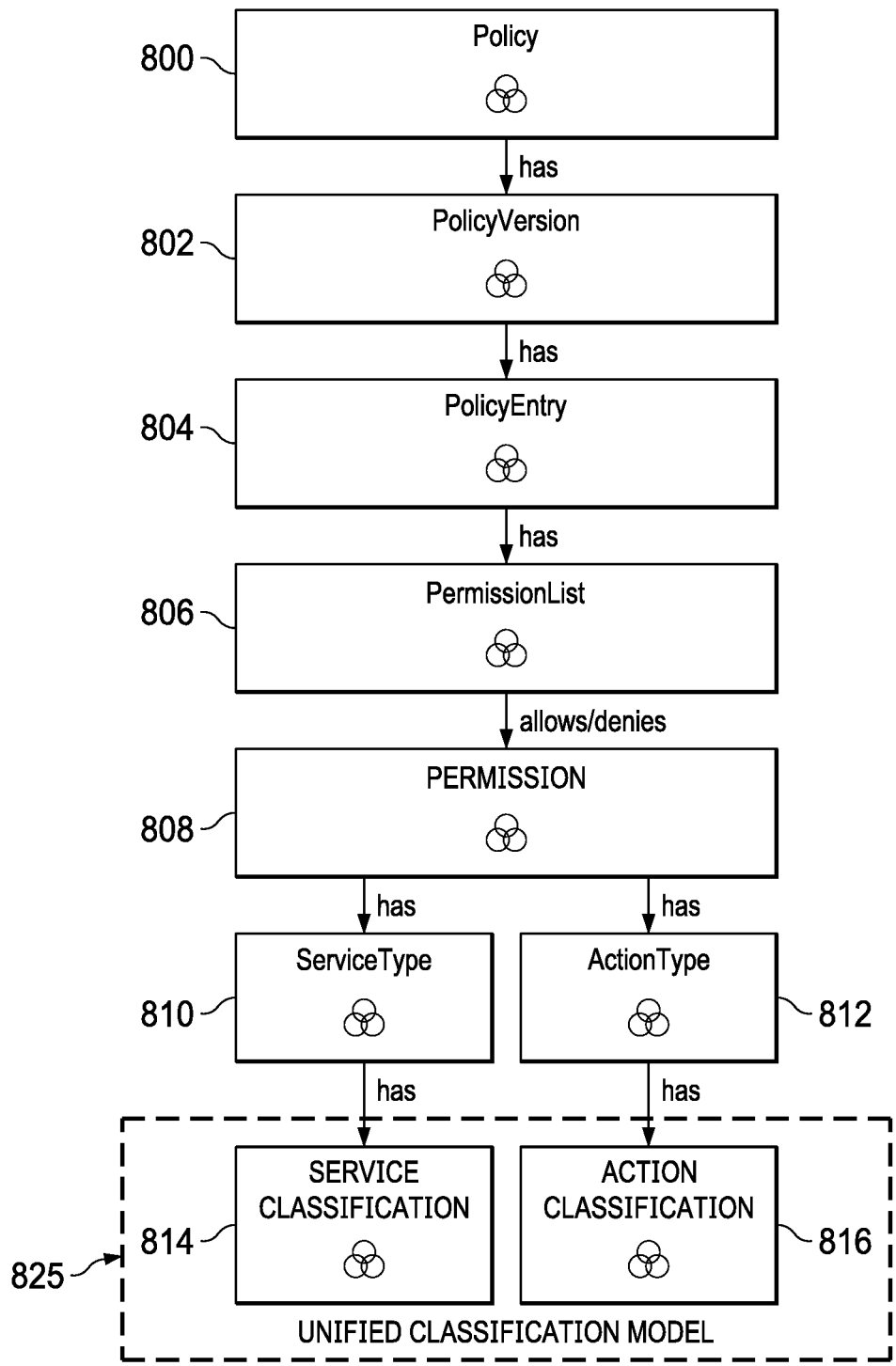
FIG. 8 depicts how the unified classification model ties to a permission model in a cloud intelligence model.

The unified classification model allows for interrogation and analytics-related Cloud Risk Control to operate across cloud policies and controls that are decoupled from the actual individual cloud action and service types. The language of the unified classification model can be expressed in various ways, such as depicted in FIGS. 7-10. For example, FIG. 7 depicts how a unified classification model ties to specific service and action types, and the corresponding actions from a given cloud provider. In FIG. 7, which is an example, Identity 702 is performed on an Action 704, which in turn is performed with respect to a Resource 706 that is part of a Service 708. Service 708 is part of an Account 710, which in turn is an account that is provisioned by a cloud provider 712. In this example, Action 704 has a ServiceType 714 and ActionType 716. The ServiceType 714 in this example has a Service Classification 718, and the ActionType 716 has an Action Classification 720. The classifications comprise a part of a Unified Classification Model that is common to the system. In another example, FIG. 8 depicts how the unified classification model ties to a permission model in a cloud intelligence model. In this example, Policy 800 has a PolicyVersion 802, which in turn has a PolicyEntry 804. The PolicyEntry 804 has a PermissionList 806 that allows or denies individual Permissions, which of which is represented as Permission 808. The Permission 808 has an associated ServiceType 810 and ActionType 812, with these types having associated Service- and Action-Classifications 814 and 816. Once again, these classifications 814 and 816 comprise part of the Unified Classification Model. FIG. 9 lists examples of normalized action types (e.g., ActionType 716 in FIG. 7, or ActionType 812 in FIG. 8). FIG. 10 lists examples of normalized service types (e.g., ServiceType 714, in FIG. 7, or ServiceType 810 in FIG. 8).

Figure 11:
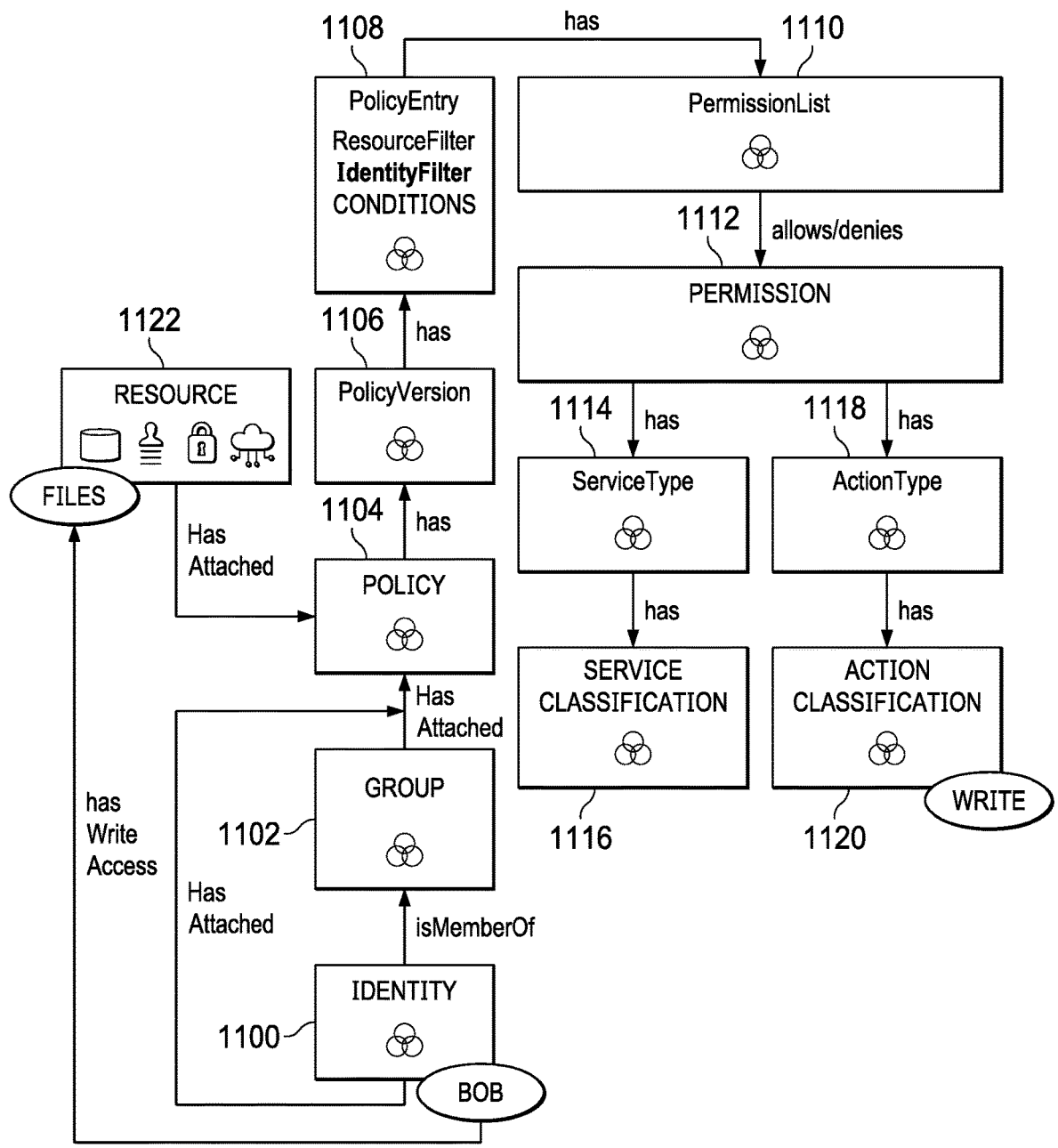
FIG. 11 depicts a representative example of how normalized pathing analytics are used to distill information from the cloud intelligence model down to deliverable cloud intelligence.

Normalized pathing analytics distill the information from the cloud intelligence model (as instantiated in the intelligence graph) down to deliverable cloud intelligence. FIG. 11 depicts an example of how a relation of an Identity (Bob) is determined to have WRITE access to a Resource (Files). In this example, Identity 1100 is a member of a Group 1102. The Identity 1100 has an attached Policy 1104, which in this example is also attached to the Group 1102. The Policy 1104 has a PolicyVersion 1106 that has a PolicyEntry 1108. The PolicyEntry 1108 has an associated PermissionList 1110 comprising permissions. Permission 1112 has a ServiceType 1114 having an associated Service Classification 1116, as well as an ActionType 1118 having an associated Action Classification 1118. The Policy 1104 manages one or more resources, such as Resource 1120. Within the collected data there are many paths (several are displayed here) which can identify that "BOB" has "WRITE" access to the Resource "FILES." Thus, and using the above-described schema, e.g., one path is as follows: Bob→Policy→PolicyVersion-→Policy Entry (FILES)→PermissionList (allows)→Permission→ActionType→WRITE. Another path is BOB-→Group→Policy→PolicyVersion∝Policy Entry (FILES) →PermissionList (allows) →Permission→ActionType→WRITE. Still another path is: FILES Policy→PolicyVersion→Policy Entry (BOB)→PermissionList (allows)→Permission→ActionType→WRITE. As is self-evident from this simple example scenario, this type of data management can get very complicated in multi-cloud, multi-account environments.

In accordance with the techniques herein, the pathing analytics distill this information down to enable easy interrogation using the query server. In a preferred embodiment, the intelligence graph for a particular enterprise customer of the service is supported in a graph database. A graph database uses graph structures for semantic queries with nodes, edges and properties to represent and store data. A graph (one or more edges and/or relationships) relates data items in the store to a collection of nodes and edges, wherein the edges represent the relationship between and among the nodes. The relationships enable data in the store to be linked together directly and, depending on the query, retrieved in one or just a few operations. Relationships also can be visualized using graph databases, making them useful for heavily inter-connected data.

As previously noted, the enterprise-specific data model and associated data is stored in the knowledge graph initially (at startup) and then configured to be queried. As the underlying information (in the various cloud environments changes), the enterprise's intelligence graph is updated, preferably continuously, e.g., via the intelligence reporting assets subsystem. At query time, the enterprise user (e.g., an authorized person) executes a query from the query server 116. The query server loads the dynamic intelligence access framework, which in turn reads the intelligence graph for the enterprise, with the graph being configured according to the cloud model. Because the access framework contains the schema model and thus the all of the information in the model, the dynamic access framework can configure and use a domain specific query language (e.g., Cypher) based on this information. A declarative graph query language of this type allows for expressive and efficient querying and updating of the graph. Use of declarative graph query language users to focus on structuring queries that are domain-specific (relevant) without having to managed underlying database access requirements.

The techniques herein provide significant advantages. A representative embodiment of the framework is a cloud data control service that finds and continuously monitors an enterprise's cloud-supported resources and all entities with access to them. This is enabled across cloud providers, cloud account and third party data stores. By providing this comprehensive view, the service enables users (e.g. DevOps and security personnel) to achieve improved data security and reduced risk (including public data exposure risks, configuration and privilege risks, crown jewel monitoring, anomalous data movements, anomalous user/developer activity, etc.), ensure compliance (e.g., GDPR compliance, data sovereignty monitoring, HIPAA, PCI and other compliance reporting, data asset inventory discovery and monitoring), and increase DevOps efficiency.

The approach provides an enterprise with a total view of all identity and data activity in its cloud accounts. The system enables cloud provider management models to be normalized with centralized analytics and views across large numbers of cloud accounts (e.g., AWS/GCP accounts, Azure subscriptions/resource groups, etc.) As previously described, a cloud data control service implemented using the framework enables an enterprise customer to model all activity and relationships across cloud vendors, accounts and third party stores. Display views of this information preferably can pivot on cloud provider, country, cloud accounts, application or data store. Using a Cloud Query Language (CQL), the system enables rapid interrogation of the complete and centralized data model of all data and identity relationships. User reports may be generated showing all privileges and data to which a particular identity has access. Similarly, data reports shown all entities having access to an asset (and the access history) can be generated. Using the display views, user can pivot all functions across teams, applications and data, geography, provider and compliance mandates, and the like.

Using the approach herein, a cloud data control (CDC) service provides a complete risk model of all identity and data relationships, including activity and movement across cloud accounts, cloud providers and third party data stores. Data risk dashboards include, without limitation, (i) views by cloud accounts, geography, data and protection, user and identity, compliance, and public exposure; (ii) security alerts (e.g., over-privileged users with access to PII, failed privilege escalation attempts, audit functions disabled by user, unusual data movement, separation of duties violations, data movement to public network, shared credential violations, etc.), (iii) compliance dashboards indicating data sovereignty, data movement and identity relationships (e.g., GDPR, HIPAA, PCI dashboards, data sovereignty monitoring, data asset inventory, customized controls and compliance dashboards, monitoring PII data movement, etc.)

Cloud Least Privilege and Access

As has been described, with widespread cloud adoption, operational workloads have transitioned from static, high-trust environments, to very dynamic, low-trust environments. In these new environments, the notion of identity is the basis for security, as identity verification provides access to services and data, and identities with thorough trust relationships can extend the scope of their permissions.

As also previously noted, in enterprise environments the "architecture" of identity can vary greatly. Distinct identity models may exist within the major cloud providers (e.g., Amazon® AWS® Identity Access & Management (IAM)), Microsoft® Azure® Active Directory, Google® Identity Access & Management (IAM)) within Single Sign-on (SSO) providers (e.g., Okta™, OneLogin™, Ping™ Identity, Microsoft® Active Directory (AD)), within cloud services (e.g., Azure Databricks, Amazon Relational Database Service (RDS)), or within other cloud agnostic services (e.g., Kubernetes, Hashicorp Vault) installed in the cloud. Moreover, it is also known that identities can be centralized to one provider or account, and this provides the ability of a particular identity to assume roles in other accounts or clouds. Further, identities can be provisioned in individual accounts. In addition, access keys and/or tokens can be created that are long- or short-lived. As a consequence, the complexity and dynamic nature of identity models and architectures can leave an organization blind in several areas: understanding the exact permission set for a given identity (this is due to the complexity in the number of ways an identity can be granted permissions to cloud services and resources; understanding who is the actual identity performing the action in a cloud account (in most cases the cloud native audit logs only show the role or access key that was used); and understanding what data identities have access to and whether they actually access the data they have permission to access. An understanding of the actual identity performing an action in the cloud account is often key to understanding what users have actually done (audit/forensics).

A further complexity arises with respect to permissions. As also previously noted, permissions often are defined in many different ways in given identity models, or with respect to particular services, or even in the clouds themselves. Indeed, there are many variations, with policies/access control specifications assigned directly to the identity, assigned to an identity group, assigned in a filter on a policy on a service and/or resource, assigned through granting access to a role in a same account, another account or even another cloud, overridden through policies at a group and/or account level, denied through conditions that exist on any of the above policies, and so forth. Given these significant differences and the fact that relevant permissions often exist across multiple cloud accounts, it is very difficult to map out what a given identity actually has permission to do in which accounts.

Figure 13:
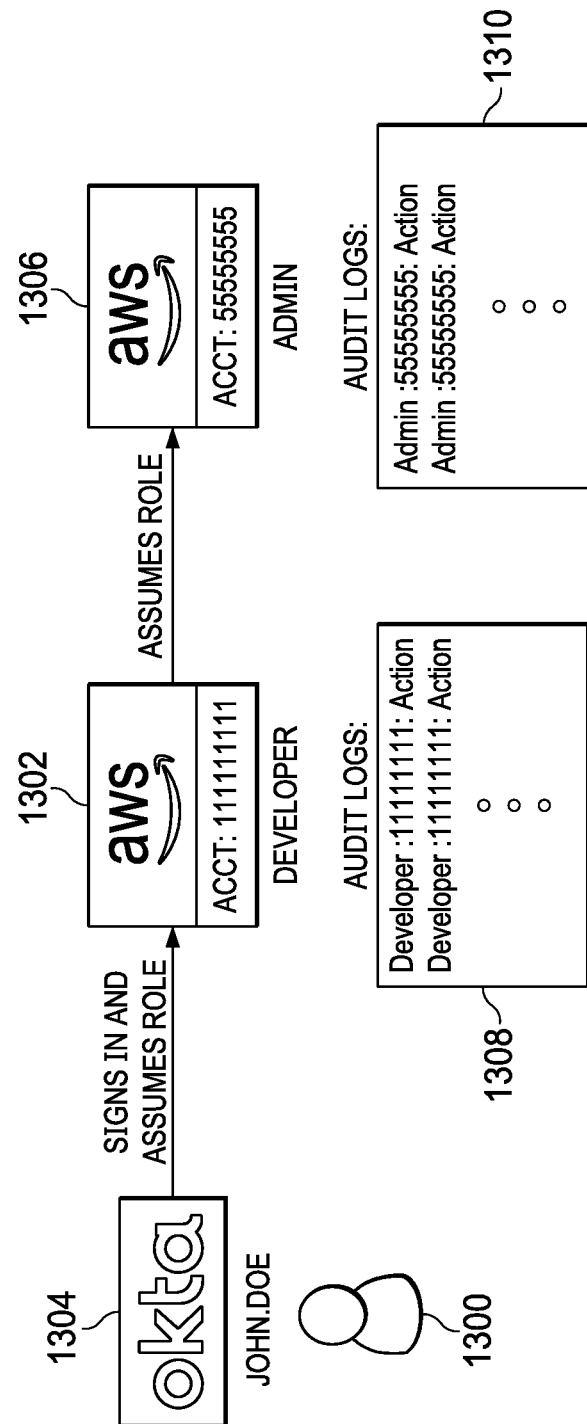
FIG. 13 depicts representative audit logs in an environment involving an identity chain.

As further background, in a typical cloud environment audit records that report what has actually happened usually only report the last identity on a chain. In other words, and with reference to FIG. 13 as an example, if a user 1300 signs into an Amazon® AWS developer account 1302 from an identity provider 1304 (e.g., Okta™) and then, through a trust relationship, assumes a role (e.g., admin) in another Amazon account 1306, then the respective audit records 1308 and 1310 generally only reflect the role in the final account in the chain. This leaves an enterprise with no or inadequate visibility or understanding of who is actually performing the actions in the given cloud account.

According to this aspect of the disclosure, the modeling and techniques previously described are augmented herein to support a cloud "least privilege and access" framework. The notion of "least privilege" refers to the notion of determining a set of minimum permissions that are associated to a given identity; the notion of "least access" refers to determining a minimal set of persons that need to have access to given piece data. As will be seen, this framework is provided to map an identity to one or more actions collected in cloud audit logs, and to dynamically-build a compete view of an identity's effective permissions, thereby resolving what data the identity has access to in order to produce least privilege and least access policies. The least privilege and access policies are then applied natively to a given cloud environment to refine access as necessary. As will be described below, the unified cloud intelligence model previously described (which unifies information from multiple clouds) facilitates the approach herein. In particular, the least privilege and access framework enables the cloud data control system to apply least privilege and access policies to cloud identities and data across a dynamic cloud environment that spans multiple cloud providers and accounts.

Figure 14:
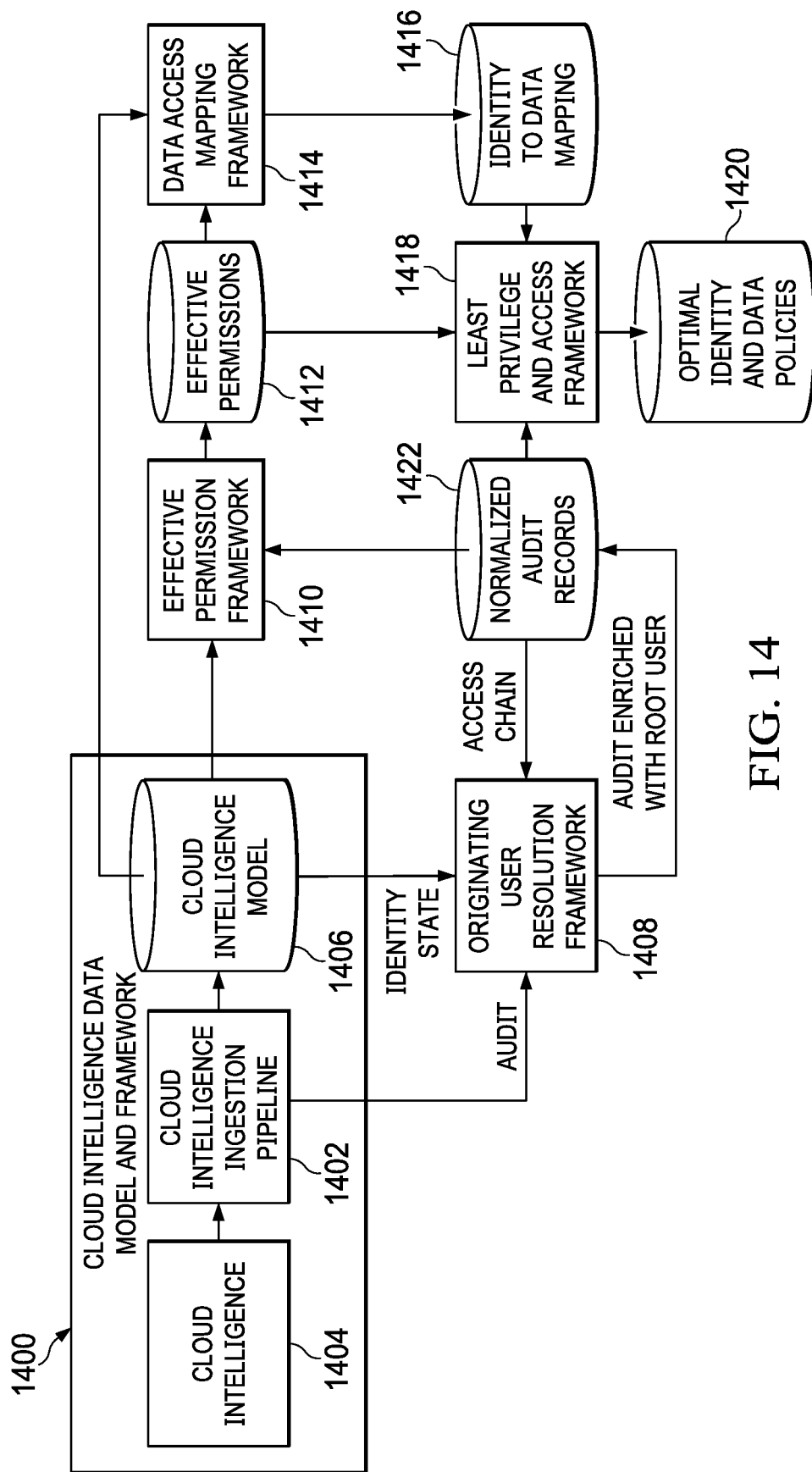
FIG. 14 depicts an architecture of a least privilege and access framework according to this disclosure.

FIG. 14 depicts how the cloud intelligence data model and framework previously described is augmented with a least privilege and access framework according to this disclosure. As depicted in the upper left portion, the cloud intelligence data model and framework 1400 comprises a cloud intelligence ingestion pipeline 1402, which receives the cloud intelligence 1404 and generates the cloud intelligence model 1406. As also depicted, an originating user resolution framework 1408 provides a means to associate normalized cloud audit data (provided by the ingestion pipeline 1402 with actual originating identity. An effective permissions framework 1410 provides a means to analyze collected permissions as represented in the cloud intelligence model 1404 in conjunction with the audit data to provide an effective permissions model 1412. The effective permissions model 1412 is read by a data access mapping framework 1414, and frameworks 1414 distills what data identities have access to, as well as whether those identities have access that data; this produces an identity-to-data mapping 1416 (what identities have access to what data). As also depicted, and as will be further described below, a least privilege and access framework 1418, which is configured to analyze several data sets (namely, the effective permissions of cloud identities, the permissions they have used, the data they have access to and have accessed, etc.) to generate least privilege and access policies. The least privilege and access policies are then used to enable native cloud applications to build optimal identity and data policies 1420. Each component, which is typically implemented as software executing in hardware, is now further described in detail.

The cloud intelligence and data model framework 1400 provides for cloud intelligence (data) ingestion, normalization and storage. As previously explained, this framework provides a mechanism for resources and their associated permissions to be collected and normalized across multiple cloud providers and accounts. Further, and as also previously described, the cloud intelligence model provides several advantages: it enables the originating user resolution framework 1408 (described below) that understands a current state of identities and their associated access keys. The model also enables the effective permissions framework 1410 to roll-up all "permissions" and "identity chains" associated with a given "originating identity." The model also facilitates providing the data access mapping framework 1414 to map data resources to identities through the determined effective permissions.

Figure 15:
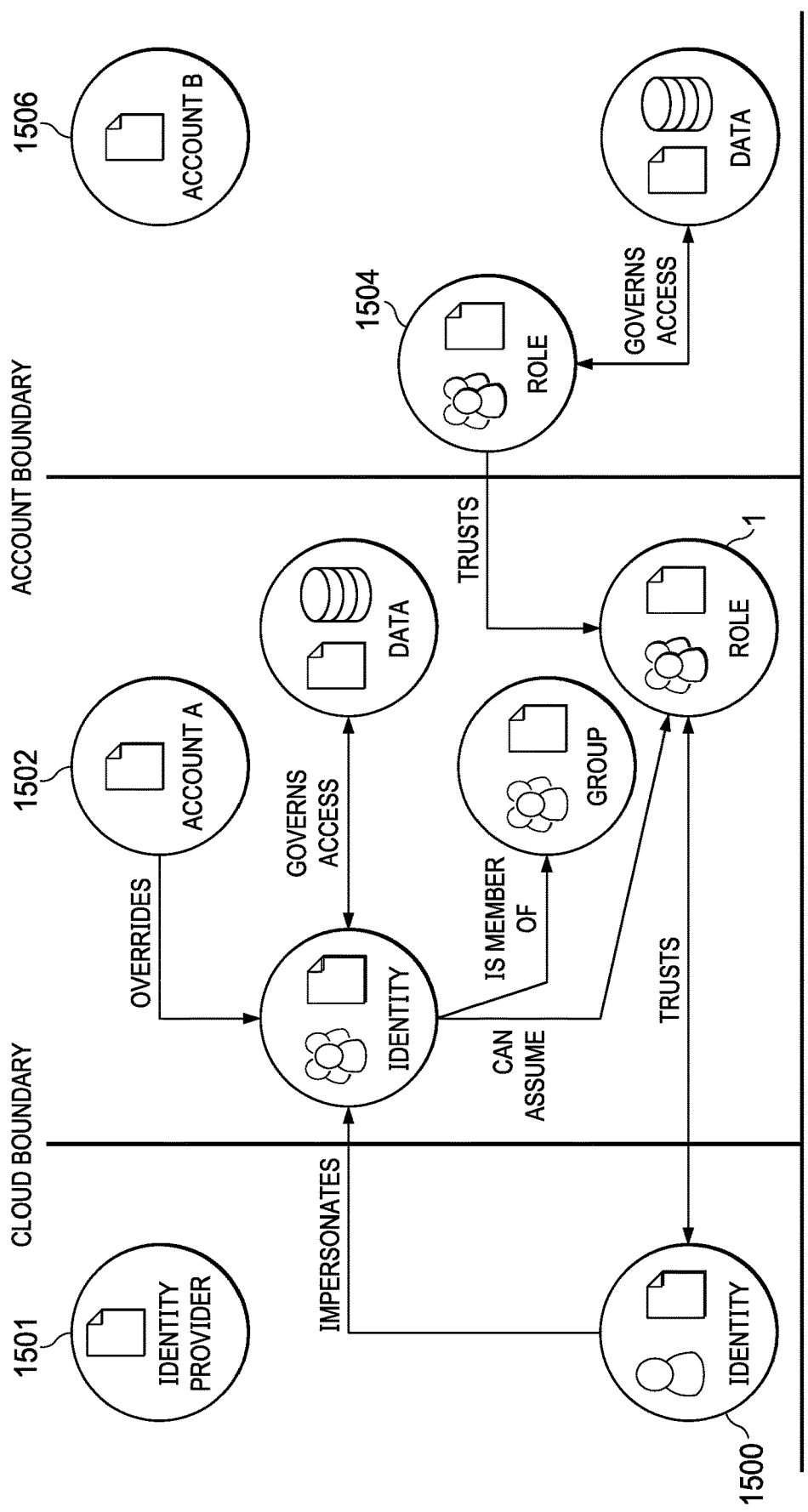
FIG. 15 depicts a representative unified policy model.

As has also been described, the approach provided by the cloud intelligence and data model framework enables building of a unified policy model based on a unified classification model. The unified policy model maps policies (regardless of where they come from) to services and actions (regardless of where they come from). FIG. 15 depicts a representative policy model developed using the modeling approach described above. In this example (which also further elaborates on the example in FIG. 13), the originating identity 1500 (e.g., provided by an identity provider 1501) is the actual identity that performs the action. Thus, if user "Bob" 1500 in Account A 1502 assumes Role 1504 in Account B 1506 and performs a certain action (e.g., a ListBuckets command), the originating identity is user "Bob." In this example, (user Bob in Account A assuming Role Developer in Account B), the identity chain represented is then "User Bob, Role Developer." More formally, the identity chain is a list of identities (including the originating identity) that are used to gain the permissions. As also previously described, permissions in dynamic cloud environments often come from a number of places (e.g., on the identity, through a group, through an account or organization, from a policy on another resource, etc.) The effective permissions for a given identity are then the actual intersection of all the permissions associated with the identity into one set (the effective permissions), which represent the one truth on what that identity actually has permission to do. The example scenario shown in FIG. 15 is highly-simplified, and a skilled person will understand that the number of hops of identity trust relationships can be obscured in complex cloud and service environments.

The originating user resolution framework 1408 in FIG. 14 uses the cloud intelligence model and previously normalized audit data 1422 to augment (enrich) incoming audit data with the actual originating user. The framework 1408 thus receives several inputs including: the current state of permanent access keys and tokens associated with the known identities in all accounts; and the audit data, which shows the role assumption and the trust actions that have been occurring in the monitored accounts. Using these inputs, the framework employs a number of methodologies to make a determination on the actual originating user; these methods include, for example, token tracing; and session analysis.

Figure 16:
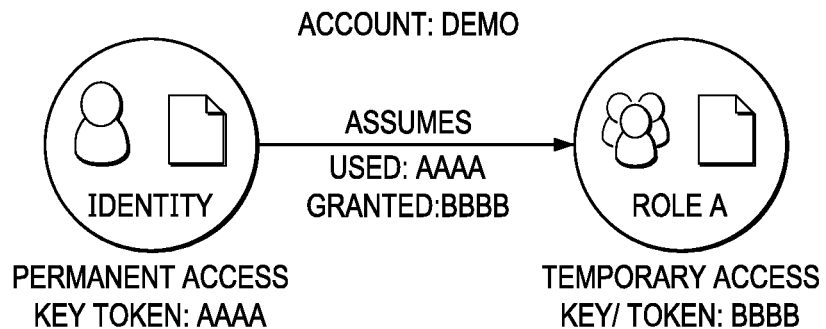
FIG. 16 depicts token tracing of access keys in particular cloud.
Figure 17:
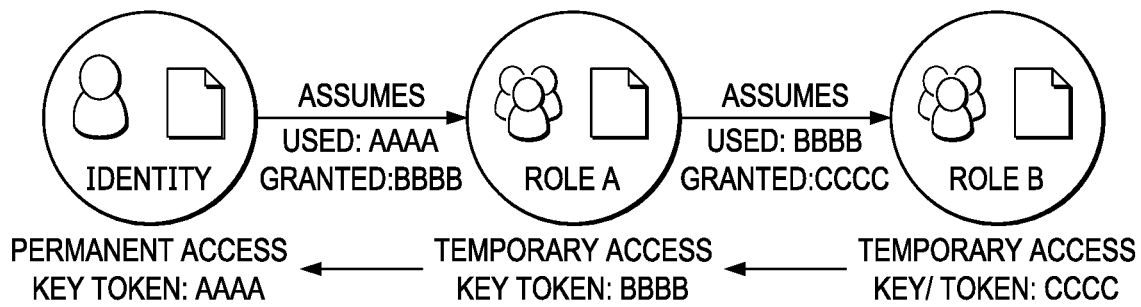
FIG. 17 depicts token tracing across multiple audit events.

Token tracing is represented by example in FIG. 16 and in FIG. 17. In token tracing, the access keys on the native cloud audit are analyzed. In some cases, a permanent access key is present in the cloud native audit. As shown in FIG. 16, this is a simple trace, in that the user is easily associated with the permanent access key and therefore associated with the cloud native audit. In other cases, e.g., where it is not a permanent access key, the cloud native audit must look back to find where the key used in the event was granted. In this situation, which is depicted in FIG. 17, this will be an event in the audit with an entry of a granted key equal to the access key in the given cloud audit. If the access key on that event is a permanent access key, it is one other hop to find the actual user. If it is not, the audit must be analyzed again. FIG. 17 in particular is an example where the tracing has to go back two audit events to determine the actual originating identity. These are merely representative use cases and are not intended to be limiting.

Session analysis is a mode that is defaulted to if there are not any access keys in the associated audit. For session analysis to resolve appropriately, both accounts must be present in the cloud native audit, and an assume role audit message must exist in both accounts. When both conditions are valid, the assume role audit message in both accounts is analyzed. On the assume role action in the SOURCE account, there is a session principal and a session date (referred to herein as the grantedSessionPrincpal and grantedSessionDate), and on the assume role action in the DESTINATION account there is same session principal and session date (referred to herein as sessionPrincipal and sessionDate). The combination of this information on the two events allows the framework to use session analysis to determine the identity that crossed the cloud boundary into this account. Once again, this is just an example scenario and is not intended to be limiting.

FIG. 18 depicts a representative tabular description of effective permission entry for a given identity. The data set depicted is also exemplary and not intended to be limiting.

Referring back to FIG. 14, the effective permission framework 1404 is the engine that analyzes the relationships in the cloud intelligence model 1406 to distill down the actual permissions attached to a given user in each account and the corresponding identity chain and policy that granted the given user those permissions. This involves an in-depth analysis of the permissions associated with identities in the cloud intelligence model and then performing an intersection to generate the implicitly-allowed and denied permissions. In a second step, the recent cloud audit is analyzed to determine if those permissions have actually been used or not.

The data access mapping framework 1414 takes the intersection of the effective permissions associated with identities and the data in the cloud intelligence model to build a mapping of identity to data 1416. This mapping provides a table of what Identities have access to which data using which permissions (READ, WRITE, UPDATE, DELETE etc.).

The least privilege and access framework 1418 generates the least privilege policies for identities, and the least access policies for data. Least privilege preferably is determined systematically by running analytics across the effective permissions on one or more given identities in the cloud accounts. In one embodiment, the following steps are applied in order to bring a given cloud account to least privilege. At a first step, the system removes and/or accepts the risk of identities that have been inactive for a configurable time period (e.g., a default of 90 days). Next, the system identifies and eliminates direct-attached policies, e.g., by eliminating users from groups that are not using group permissions, by moving users with direct-attached permissions to groups with the same permissions, identifies users with similar permissions and creating a group for those users, while removing their direct-attached permissions. Then, the system identifies and eliminates unused trust relationships and enforces bi-directional trust by evaluating any roles with trust relationships and then limiting the trust to only identifies actually assume the role. In this step, the system also evaluates identities with permissions to assume roles and limits their permissions to only roles they assume. Next, the system identifies permissions that give unintended trust and removes them if they are not being used. Some example permissions include, without limitation: pass role, upload public key, generate access key, and update resource policy. The system then identifies and eliminates unintended inheritance, e.g., by evaluating permissions where access to a smaller subsection of a resource or account can be granted at a specific level instead of at a global level. Next, the system optimizes roles and group permissions based on the identities that use them, e.g., limiting service permissions to only the services actually used, limiting to individual permissions where all permissions are granted, and limiting to read-only permissions if only read permissions are used, etc. Finally, the system optimizes individual permissions, preferably according to one or more guidelines such as set out in the operation that optimizes roles and group permissions.

One or more of the above-described operations to determine least privilege may be omitted, and a different sequence of such steps may be implemented.

Least access is determined by running analytics on the data access mapping 1416 and the cloud native audit 1422 to determine identities that are over-permissioned on the data. From that information, a cloud native application is generated to apply the resulting least access policy (preferably at the account level) on a given piece of data to restrict only the necessary access. In one embodiment, the following systematic steps are applied to determine least access. First, the system identifies where such access is occurring and to add conditions to enforce least access on the identities, e.g., by enforce multi-factor authentication (MFA), apply one or more access restrictions (e.g., IP address-based, time-of-day, etc.), and apply one or more called via restrictions. Next, the system identifies and applies one or more data conditions, e.g., according to a baseline of who regularly accesses the data, or some other configurable criteria. The system then identifies and removes any indirect access to the data. Finally, the system identifies and adds one or more conditions to one or more data policies, e.g., according to baseline usage (IP address, location, account, etc.).

One or more of the above-described operations to determine least access may be omitted, and a different sequence of such steps may be implemented.

The least privilege and access framework 1418 provides several advantages to the dynamic multi-cloud environment organizations are presented with today. These advantages include the following: continuous dynamic least privilege, and continuous dynamic least access. Continuous dynamic least privilege refers to the notion that the engine preferably keeps a dynamic cloud environment's identities set at least privilege; in particular, and through continuous calculation of effective permissions and monitoring of audit, the identities in these environments are adjusted continually to least privilege. Continuous dynamic least access refers to the notion that the engine keeps the data within a dynamic cloud environment tuned so that access is only granted to those that actually need it; in particular, and through continuous calculation of effective permissions, audit monitoring and data mapping, the policies on the data in these environments preferably are adjusted continually to "least access" (such that only the necessary people have access to the given data).

Figure 19:
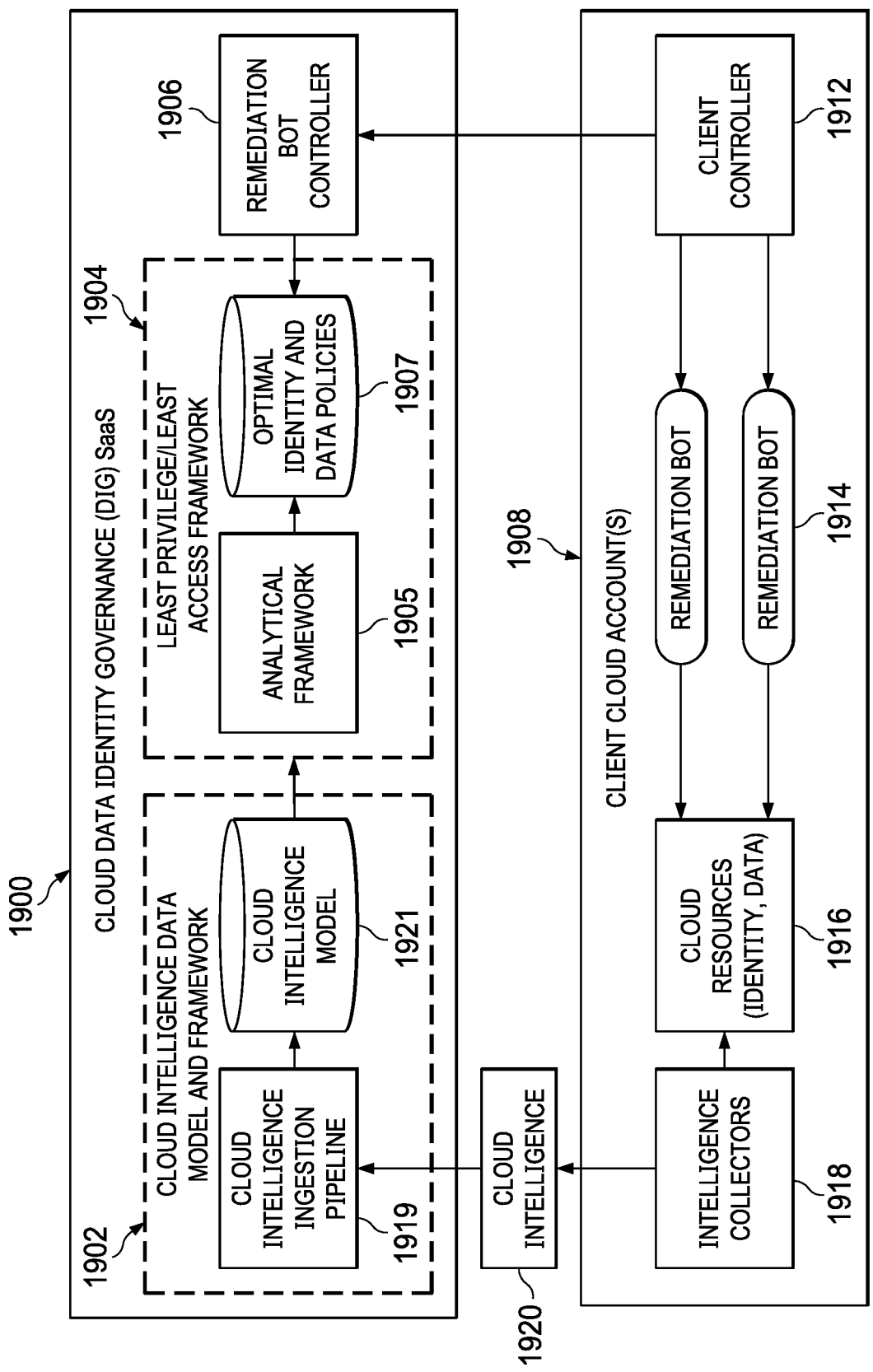
FIG. 19 depicts a Cloud Data Identity Governance (DIG) Software-as-a-Service (SaaS)-based solution that incorporates the techniques of this disclosure.

With reference now to FIG. 19, a system configured to apply a least privilege policy for identity, and to apply a least access policy for data, is depicted. In this implementation, the adjusted identity and data policies configured by the least privilege and access mechanisms described above are applied to actual resources in a client account, preferably in an automated manner. To this end, and as depicted in FIG. 19, an end-to-end Cloud Data Identity Governance (DIG) Software-as-a-Service (SaaS) solution 1900 comprises the cloud intelligence data model and framework 1902, and the least privilege/least access framework 1904 previously described, together with a remediation bot controller 1906. Client cloud account(s) 1908 being managed by the Cloud DIG SaaS solution 1900 are also depicted and comprise a client controller 1912, and one or more remediation bots 1914, together with the applicable cloud resources 1916 being managed. FIG. 19 also depicts the intelligence collectors 1918 and the resulting cloud intelligence 1920 generated by those collectors and used to generate the cloud intelligence model 1921, as previously described. The remediation bot controller 1906, the client controller 1912 and its associated remediation bots 1914 together comprise a remediation bot engine that provides an automated mechanism by which the policies generated by the least privilege/least access framework 1904 are applied to the cloud resources. As shown, there is a separate remediation bot 1914 for applying the least privilege policy, and another for applying the least access policy, but this is not a requirement; a single remediation may be utilized. The remediation bot controller 1906 receives the least privilege and least access policies from the framework 1904 and controls the application of these policies to the correct cloud accounts. The client controller 1912 interacts with the remediation bot controller 1906 over a request-response interface, e.g., to fetch the new policies and apply them using the one or more remediation bots 1914. The remediation bot controller 1906 may push out policies proactively, or wait until the client controller polls the controller 1906 and then pulls any available policy updates that are then available from the controller 1906. Typically, the functional elements/components depicted in FIG. 19 are implemented as software, with the data elements implemented in a database.

From an end-to-end perspective, the intelligence collectors 1918 query the client cloud resources 1916 and transmit the resulting cloud intelligence 1920 on those resources through the cloud intelligence ingestion pipeline 1919 and into the cloud intelligence model 1921. The least privilege/access framework 1904 queries the cloud intelligence model 1921 and (through its analytical framework 1905) calculates the optimal identity and data policies 1907 for the monitored resources. In one implementation, the client controller 1912 calls home to the remediation bot controller 1906 periodically to retrieve the policies to be applied. In this embodiment, the client controller 1912 then spawns the remediation bots 1914 to apply the policies to the cloud resources 1916. The process then iterates. In this manner, the system provides dynamic and automated data identity governance.

The least privilege and least access policies may be applied to the cloud resources being managed periodically, synchronously or asynchronously, on-demand, or upon occurrence of some other event or activity.

While the above description sets forth a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computing entity selectively activated or reconfigured by a stored computer program stored. Such a computer program may be stored in a computer readable storage medium, such as, but is not limited to, any type of disk including an optical disk, a CD-ROM, and a magnetic-optical disk, flash memory, a read-only memory (ROM), a random access memory (RAM), a magnetic or optical card, or any type of non-transitory media suitable for storing electronic instructions.

While given components of the system have been described separately, one of ordinary skill will appreciate that some of the functions may be combined or shared in given instructions, program sequences, code portions, and the like.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

The techniques herein provide for improvements to another technology or technical field, namely, data analytics tooling, applications and systems, as well as improvements to cloud computing infrastructures that support such functions and technologies.

A cloud risk control system as described and depicted may be implemented within a cloud compute infrastructure, or as an adjunct to one or more third party cloud compute infrastructures. The cloud risk control system may be implemented in whole or in part by a service provider on behalf of entities (e.g., enterprise customers) that use third party cloud computing resources. A typical implementation provides for cloud risk control-as-a-service in the manner described herein. Portions of the cloud risk control system may execute in an on-premises manner within or in association with an enterprise. The cloud risk control system preferably comprises a web-accessible portal (e.g., an extranet application) that is accessible via a browser or mobile app via HTTP/HTTPS, or other protocol.

Communications between devices and the cloud risk control system are preferably authenticated and secure (e.g., over SSL/TLS).

What is claimed is as follows:

1. A method to determine a set of privileges and data access requirements for a cloud native application associated with an enterprise, comprising:
  receiving identity and audit data from a set of cloud deployments, wherein the enterprise has an associated set of cloud accounts hosted in the set of cloud deployments, wherein the audit data comprises role assumption and trust actions that have been occurring in the cloud accounts;
  for each given identity, and according to a cloud intelligence model, determining a set of effective permissions for the given identity, wherein the effective permissions for the given identity comprise an intersection of all permissions associated with the given identity as received from the set of cloud deployments, thereby representing what that given identity, both directly, and indirectly through one or more identity trust relationships across the cloud deployments, actually has permission to do;
  determining, based on the set of effective permissions for each of a set of identities in the identity and the audit data, an identity-to-data mapping that identifies what identities in the set have access to what data using which permissions;
  processing the set of effective permissions for the given identity into a privilege policy representing a permission set; and
  processing the identity-to-data mapping and audit data into an access policy for the data.

2. The method as described in claim 1 wherein the privilege policy is a least privilege policy, and wherein the cloud native application applies the least privilege policy to the given identity at an account level to reduce the permission set of the given identity to least privilege, wherein least privilege is a set of minimum permissions that are associated to a given identity.

3. The method as described in claim 1 wherein the access policy is a least access policy, and wherein the cloud native application applies the least access policy at an account level on given data to restrict access to the given data to users having a need to access the given data, wherein least access is a minimal set of identities that need to have access to the given data.

4. The method as described in claim 1 wherein the permission set is generated by:
  rolling up all of the effective permissions for the given identity;
  removing unused permissions; and
  removing permissions or combinations of permissions that pose a security risk.

5. The method as described in claim 1 wherein the access policy is generated at least in part by determining identities that are over-permissioned.

6. The method as described in claim 1 including updating the privilege policy continuously.

7. The method as described in claim 6 wherein updating the privilege policy continuously maintains the set of identities at least privilege.

8. The method as described in claim 1 including updating the access policy continuously.

9. The method as described in claim 1 further including augmenting the audit data with information associated with an originating identity, wherein an originating entity is an actual user that performs an action identified in the audit data.

10. The method as described in claim 9 further including determining the originating identity based on a current state of access keys and tokens associated with known identities in the cloud accounts.

11. The method as described in claim 10 wherein the originating identity is determined by one of: token tracing, and session analysis.

12. The method as described in claim 1 wherein the set of cloud deployments include first and second deployments managed by distinct service providers.

13. Apparatus, comprising:
  a processor;
  computer memory holding computer program instructions executed by the processor to determine a set of privileges and data access requirements for a cloud native application associated with an enterprise, the computer program instructions comprising:
    program code configured to receive identity and audit data from a set of cloud deployments, wherein the enterprise has an associated set of cloud accounts hosted in the set of cloud deployments, wherein the audit data comprises role assumption and trust actions that have been occurring in the cloud accounts;
    program code configured, for each given identity, and according to a cloud intelligence model, to determine a set of effective permissions for the given identity, wherein the effective permissions for the given identity comprise an intersection of all permissions associated with the given identity as received from the set of cloud deployments, thereby representing what that given identity, both directly, and indirectly through one or more identity trust relationships across the cloud deployments, actually has permission to do;

program code configured to determine, based on the set of effective permissions for each of a set of identities in the identity and the audit data, an identity-to-data mapping that identifies what identities in the set have access to what data using which permissions;

program code to process the set of effective permissions for the given identity into a privilege policy representing a permission set; and program code to process the identity-to-data mapping and audit data into an access policy for the data.

14. The apparatus as described in claim 13 wherein the computer program instructions further include program code to apply one of: the privilege policy and the access policy, to one or more cloud resources being managed.

15. The apparatus as described in claim 14 wherein the privilege policy is a least privilege policy, and wherein the program code further controls the cloud native application, thereby applying the least privilege policy to the given identity at an account level to reduce the permission set of the given identity to least privilege, wherein least privilege is a set of minimum permissions that are associated to a given identity.

16. The apparatus as described in claim 14 wherein the access policy is a least access policy, and wherein the program code further controls the cloud native application, thereby applying the least access policy at an account level on given data to restrict access to the given data to users having a need to access the given data, wherein least access is a minimal set of identities that need to have access to the given data.

17. The apparatus as described in claim 13 wherein the program code to process the set of effective permissions comprises program code that generates the permission set by:

rolling up all of the effective permissions for the given identity;

removing unused permissions; and removing permissions or combinations of permissions that pose a security risk.

18. The apparatus as described in claim 13 wherein program code to process the identity-to-data mapping and audit data into a least access policy comprises program code that determines identities that are over-permissioned.

19. The apparatus as described in claim 13 wherein the set of cloud deployments include first and second deployments managed by distinct service providers.

* * * * *